(12) United States Patent
Thomas et al.

(10) Patent No.: US 11,617,305 B2
(45) Date of Patent: Apr. 4, 2023

(54) CROP RAMPS FOR COMBINE HEADERS

(71) Applicant: CNH Industrial America LLC, New Holland, PA (US)

(72) Inventors: Jeff Thomas, Gordonville, PA (US); Benjamin Kemmerer, Hamburg, PA (US); Herbert M. Farley, Elizabethtown, PA (US); Scott Deichmann, Phoenixville, PA (US)

(73) Assignee: CNH Industrial America LLC, New Holland, PA (US)

( * ) Notice: Subject to any disclaimer, the term of this patent is extended or adjusted under 35 U.S.C. 154(b) by 376 days.

(21) Appl. No.: 16/880,680

(22) Filed: May 21, 2020

(65) Prior Publication Data
US 2021/0360855 A1 Nov. 25, 2021

(51) Int. Cl.
| | | |
|---|---|---|
| A01D 61/00 | (2006.01) | |
| A01D 41/12 | (2006.01) | |
| A01D 41/14 | (2006.01) | |
| A01D 57/20 | (2006.01) | |
| A01D 57/26 | (2006.01) | |

(Continued)

(52) U.S. Cl.
CPC ....... *A01D 61/008* (2013.01); *A01D 41/1252* (2013.01); *A01D 41/14* (2013.01); *A01D 57/20* (2013.01); *A01D 57/26* (2013.01); *A01D 61/02* (2013.01); *B65G 21/2081* (2013.01)

(58) Field of Classification Search
CPC .. A01D 61/008; A01D 41/1252; A01D 41/14; A01D 57/20; A01D 57/26; A01D 61/02; B65G 21/2063; B65G 21/2072; B65G 21/2081
See application file for complete search history.

(56) References Cited

U.S. PATENT DOCUMENTS

| | | | | |
|---|---|---|---|---|
| 3,651,931 A | * | 3/1972 | Hsiung | A61K 8/368 424/47 |
| 6,305,154 B1 | * | 10/2001 | Yang | A01D 34/13 56/307 |

(Continued)

FOREIGN PATENT DOCUMENTS

| | | |
|---|---|---|
| DE | 102004024232 A1 | 12/2005 |
| EP | 0250649 A1 | 1/1988 |

(Continued)

OTHER PUBLICATIONS

Extended European Search Report for EP application 21175114.4, dated Oct. 21, 2021 (7 pages).

*Primary Examiner* — Mark A Deuble
(74) *Attorney, Agent, or Firm* — Peter Zacharias; Patrick Sheldrake

(57) ABSTRACT

A crop ramp for use in a combine header is provided. The crop ramp includes a flat section, a curved section, and a flange. The flat section facilitates coupling the crop ramp to a cutterbar of the combine header. The curved section extends from the flat section. The curved section is configured to facilitate transfer of crop to a belt system of the combine header. The crop is transferred in a first direction defined from the flat section to the curved section. The flange extends from the curved section. The flange is configured to hover above the belt system of the combine header to prevent dirt from flowing in a second direction which is opposite to the first direction.

17 Claims, 13 Drawing Sheets

(51) Int. Cl.
    *A01D 61/02*     (2006.01)
    *B65G 21/20*     (2006.01)

(56) References Cited

U.S. PATENT DOCUMENTS

| | | | |
|---|---|---|---|
| 7,600,364 B2 * | 10/2009 | Lovett | A01D 57/20 56/181 |
| 7,788,891 B2 * | 9/2010 | Puryk | A01D 61/002 56/153 |
| 7,908,836 B1 * | 3/2011 | Rayfield | A01D 57/20 56/181 |
| 7,975,458 B1 | 7/2011 | Noll | |
| 8,205,421 B2 * | 6/2012 | Sauerwein | A01D 57/20 56/181 |
| 8,555,607 B2 | 10/2013 | Coers | |
| 8,776,487 B2 | 7/2014 | Coers | |
| 9,271,443 B2 * | 3/2016 | Sethi | A01D 57/00 |
| 9,591,802 B2 * | 3/2017 | Allochis | A01D 34/18 |
| 9,635,810 B2 * | 5/2017 | Leys | A01D 34/40 |
| 9,795,086 B2 * | 10/2017 | Hasenour | A01D 57/20 |
| 9,814,183 B2 | 11/2017 | Allochis | |
| 2012/0043185 A1 * | 2/2012 | Dow | A01D 61/002 198/837 |
| 2014/0150395 A1 | 6/2014 | Coers | |
| 2019/0373815 A1 * | 12/2019 | Modak | A01D 34/40 |

FOREIGN PATENT DOCUMENTS

| | | | |
|---|---|---|---|
| EP | 3308621 A1 | 4/2018 | |
| EP | 3516944 A1 | 7/2019 | |

\* cited by examiner

CROP RAMPS FOR COMBINE HEADERS

TECHNICAL FIELD

The present disclosure relates to combine headers and assemblies, and more specifically to crop ramps for preventing buildup in combine headers.

BACKGROUND

Combine harvesters (or combines) are multipurpose machines for agricultural harvesting operations including reaping, threshing, and winnowing. Combines can perform harvesting operations on crops such as wheat, oats, corn, soybeans, sunflowers, rice, etc. Combines are equipped with removable headers, and in some implementations, headers can be designed for particular crops. For example, a combine can be equipped with a header optimized for harvesting corn, and then that header can be detached from the combine so that a header optimized for harvesting wheat can be installed on the combine.

Some combine headers (e.g., grain headers) have a full length auger for feeding cut crops to the center of the header. Some combine headers (e.g., draper headers) have a belt system that facilitates feeding the cut crops to the center. Combine headers that use belt systems can collect dirt, roots, and other materials at the cutterbar and underneath the belts, such that the combine headers would have to be stopped periodically to remove accumulated dirt. The present disclosure provides crop ramp designs for use in a combine header to reduce material buildup and accumulation and to address other problems that may arise while using the combine header.

SUMMARY

According to some implementations, the present disclosure provides a crop ramp for use in a combine header. The crop ramp includes: (a) a flat section for coupling the crop ramp to a cutterbar of the combine header, (b) a curved section extending from the flat section, the curved section configured to facilitate transfer of crop to a belt system of the combine header, wherein the crop is transferred in a first direction defined from the flat section to the curved section; and (c) a flange extending from the curved section, the flange configured to hover above the belt system of the combine header to prevent dirt from flowing in a second direction which is opposite to the first direction.

According to some implementations, the present disclosure provides a combine header comprising: (a) a cutterbar configured to cut crops; (b) a belt system configured to facilitate movement of the cut crops toward a feeder house; and (c) a plurality of crop ramps. A respective crop ramp of the plurality of crop ramps includes: (i) a flat section for coupling the respective crop ramp to the cutterbar; (ii) a curved section extending from the flat section, the curved section facilitating transfer of the cut crops to the belt system, wherein the cut crops travel along a surface of the curved section in a first direction, the first direction oriented from the flat section towards the curved section; and (iii) a flange extending from the curved section, the flange configured to hover above the belt system to prevent dirt from flowing in a second direction which is oriented opposite to the first direction.

The foregoing and additional aspects and implementations of the present disclosure will be apparent to those of ordinary skill in the art in view of the detailed description of various embodiments and/or implementations, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
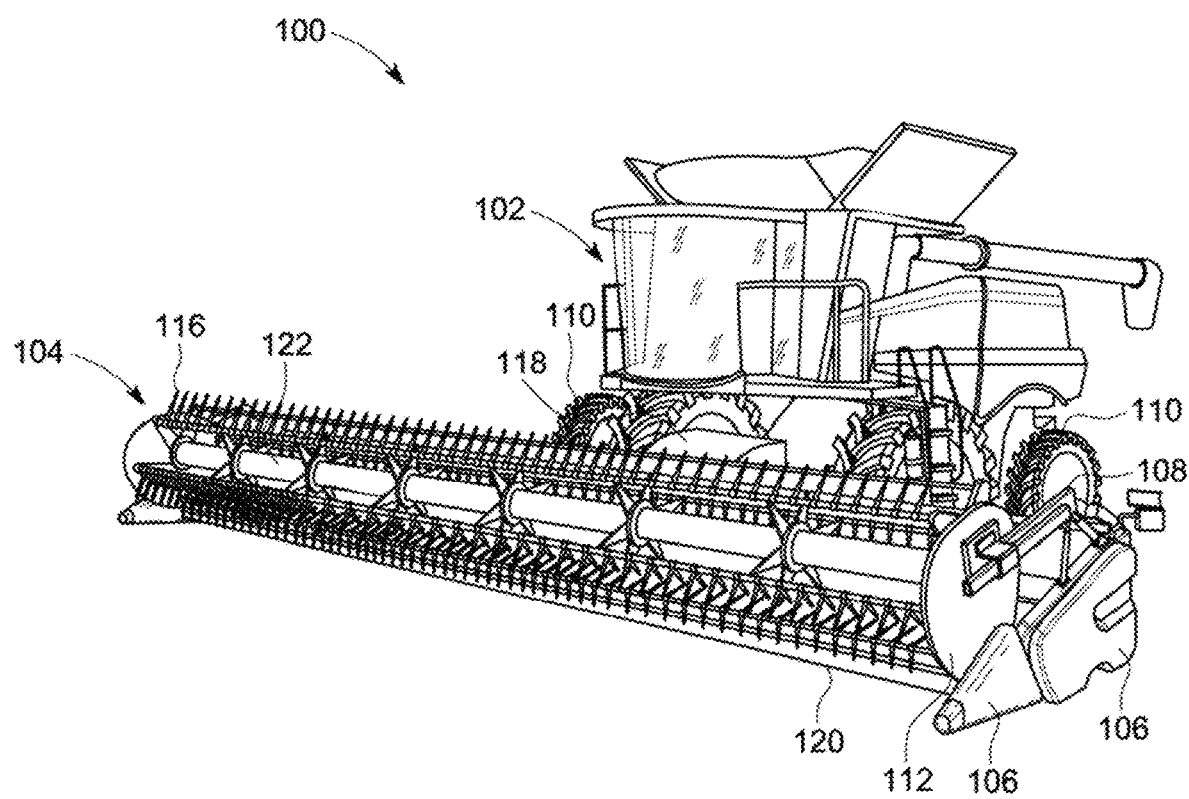
FIG. 1 illustrates a front perspective view of a combine with an attached header according to some implementations of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Combine headers come in different flavors or types. For example, there are grain headers, flex headers, corn headers, pick-up headers, draper headers, etc. Embodiments of the present disclosure will be illustrated with draper headers. Draper headers are merely used as an example, and some embodiments can be applied to a different type of combine header. Compared to grain headers and flex headers, draper headers do not have a full length auger for feeding crops to the center of the header. Instead, draper headers have one or more belts that feed crops from the sides of the header to the center of the header.

FIG. 1 illustrates a front perspective view of a combine harvester system 100 according to some implementations of the present disclosure. The combine harvester system 100 includes a combine 102 attached to a header 104. In some implementations, the header 104 is a draper header. The header 104 attaches to the combine 102 at a feeder house 118. The combine 102 includes wheels 110 for propelling the combine harvester system 100 in a forward direction while the combine harvester system 100 is performing harvesting operations.

In FIG. 1, the header 104 attached to the combine 102 includes a reel 112, a decorative cover 106 covering a frame of the header 104, and a bottom deck 120 including a plurality of knives or teeth. As the combine harvester system 100 travels in the forward direction, the knives on the bottom deck 120 cut crops at a certain height. The height where crops are cut is dependent on a relative height of the knives from the ground. As the crops are being cut, the reel 112 rotates in a direction that facilitates the cut crops to be collected on the bottom deck 120. The reel 112 is supported on the frame of the header 104 by one or more supporting bars 108. The reel 112 includes a cylindrical member 122 with extensions that support a plurality of tines 116. The plurality of tines 116 facilitate collecting the cut crops on the bottom deck 120. The bottom deck 120 can be a flexible component where parts within the bottom deck 120 can move relative to each other. The bottom deck 120 includes a feeder system (not shown) for directing the collected cut crops to the feeder house 118. The feeder system in a grain header is an auger, and the feeder system in a draper header are conveyor belts.

Figure 2:
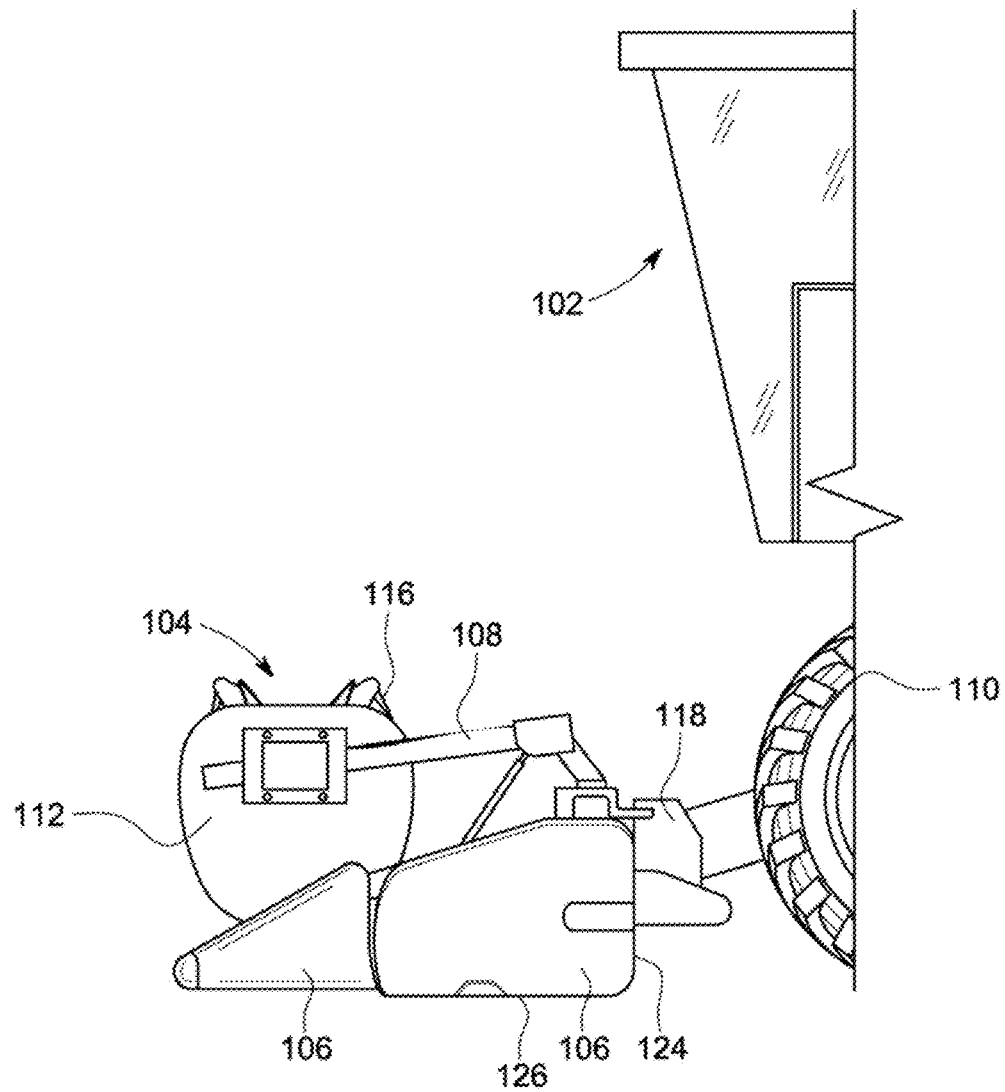
FIG. 2 illustrates a side view of the combine with the attached header of FIG. 1.

FIG. 2 illustrates a side view of the combine 102 with the header 104 of FIG. 1. The header 104 can range from 20 feet to 50 feet long in a direction transverse to the forward direction of travel of the combine harvester system 100. In some implementations, the header 104 can weigh in excess of 5,000 pounds ("lbs"), even reaching 15,000 lbs. Thus, stopping the combine 102 and the header 104 to remove dirt and other accumulated debris from the bottom deck 120 can be an involved process due to the sheer size of the header 104.

Figure 3:
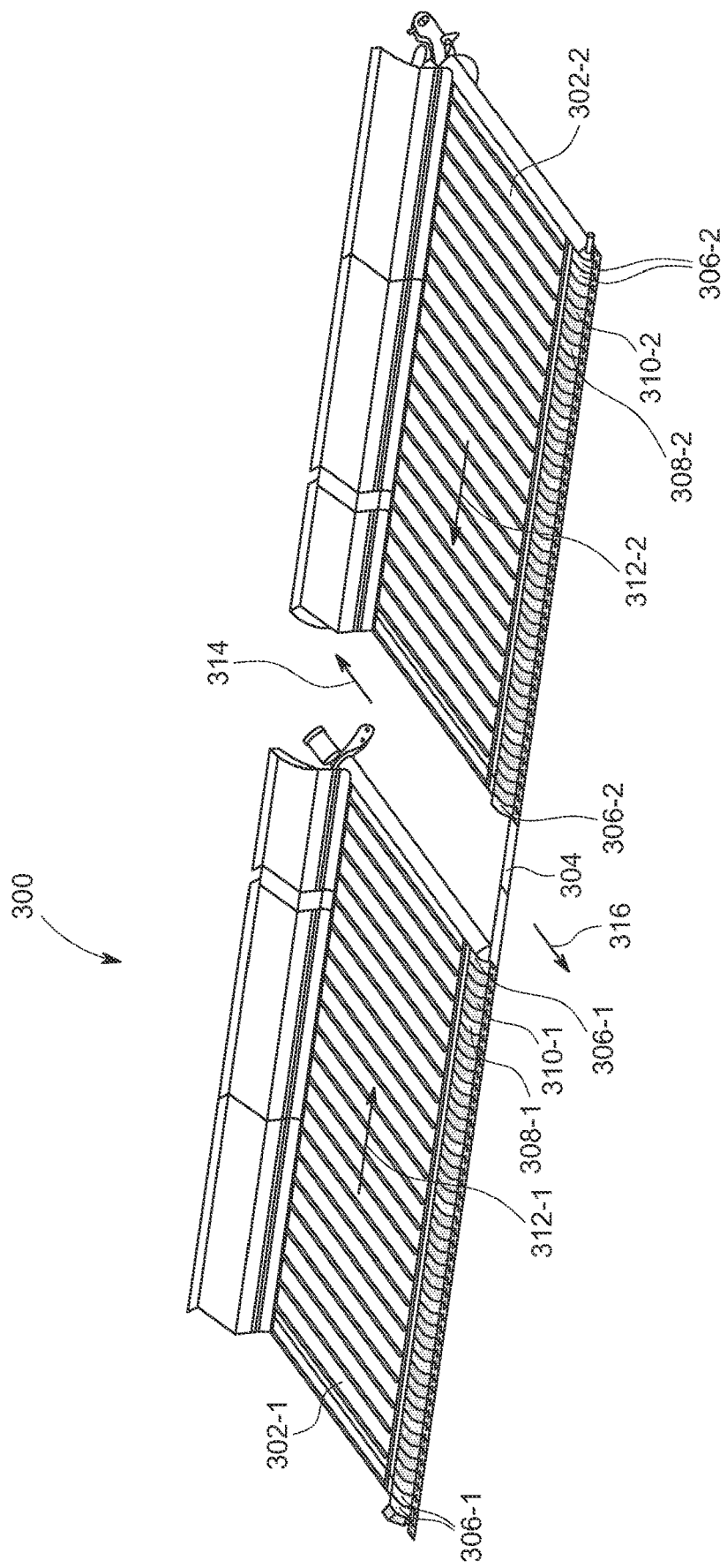
FIG. 3 illustrates a bottom deck of a header according to some implementations of the present disclosure.

FIG. 3 illustrates a bottom deck 300 of a header (e.g., the header 104) according to some implementations of the present disclosure. The bottom deck 300 includes a left side belt 302-1 and a right side belt 302-2. The left side belt 302-1 is a conveyor belt that moves in a direction indicated by an arrow 312-1. The right side belt 302-2 is a conveyor belt that moves in a direction indicated by an arrow 312-2. The bottom deck 300 can include a center belt (not shown) that moves in a direction indicated by an arrow 314. The left side belt 302-1, the right side belt 302-2, and the center belt form a belt system (or feeder system) for directing collected cut crops to a feeder house (e.g., the feeder house 118).

The bottom deck 300 includes a cutterbar 304. Combine headers that use belt systems can collect dirt, roots, and other materials at the cutterbar and underneath the belts, such that the combine headers should be stopped periodically to remove accumulated dirt. The header moves in a direction indicated by an arrow 316 when harvesting crops, such that the cutterbar 304 on the bottom deck 300 cuts crops.

The bottom deck 300 includes a plurality of crop ramps attached to the cutterbar 304. The plurality of crop ramps promotes cut crops to be collected on the belt system of the bottom deck 300. The left side belt 302-1 and the right side belt 302-2 move cut crops laterally while the plurality of crop ramps facilitates crop movement onto the lateral belts. Cut crops can move in a direction (e.g., the direction 316) that is substantially orthogonal to the lateral movement of the left side belt 302-1 and the right side belt 302-2. The plurality of crop ramps includes a set of crop ramps on a left side of the bottom deck 300 and a set of crop ramps on a right side of the bottom deck 300. The bottom deck 300 is shown without crop ramps in the center for illustration purposes so that the cutterbar 304 is visible. In some implementations, the plurality of crop ramps includes a set of crop ramps on the center of the bottom deck 300.

The set of crop ramps on the left side includes first left side crop ramps 306-1, second left side crop ramps 308-1, and third left side crop ramps 310-1. The first left side crop ramps 306-1 can be attached at locations on the cutterbar 304 near edges of the left side belt 302-1. The first left side crop ramps 306-1 can aid in evacuating debris caught inside the left side belt 302-1. The first left side crop ramps 306-1 can thus be provided at the locations on the cutterbar 304 which are close to rollers of the left side belt 302-1. The second left side crop ramps 308-1 can be attached at locations on the cutterbar 304 across from where flex arms (not shown) of the bottom deck 300 are located. The third left side crop ramps 310-1 fill in locations on the left side of the bottom deck 300 that are not taken by the first left side crop ramps 306-1 and the second left side crop ramps 308-1.

Similarly, the set of crop ramps on the right side includes first right side crop ramps 306-2, second right side crop ramps 308-2, and third right side crop ramps 310-2. The first right side crop ramps 306-2 can be attached at locations on the cutterbar 304 near edges of the right side belt 302-2 and can aid in evacuating debris caught inside the right side belt 302-2. The first right side crop ramps 306-2 can thus be provided at the locations on the cutterbar 304 which are close to rollers of the right side belt 302-2. The second right side crop ramps 308-2 can be attached at locations on the cutterbar 304 across from where flex arms (not shown) of the bottom deck 300 are located. The third right side crop ramps 310-2 fill in locations on the right side of the bottom deck 300 that are not taken by the first right side crop ramps 306-2 and the second right side crop ramps 308-2.

Although discussed in connection with three types of crops ramps on each side of the bottom deck 300, in some implementations, the bottom deck 300 is only provided with one type of crop ramp, two types of crop ramps, four types of crop ramps, five types of crop ramps, etc. Additionally, arrangement of the types of crop ramps can vary in some implementations. FIG. 3 is merely provided as an example arrangement for the different types of crop ramps.

Figure 4:
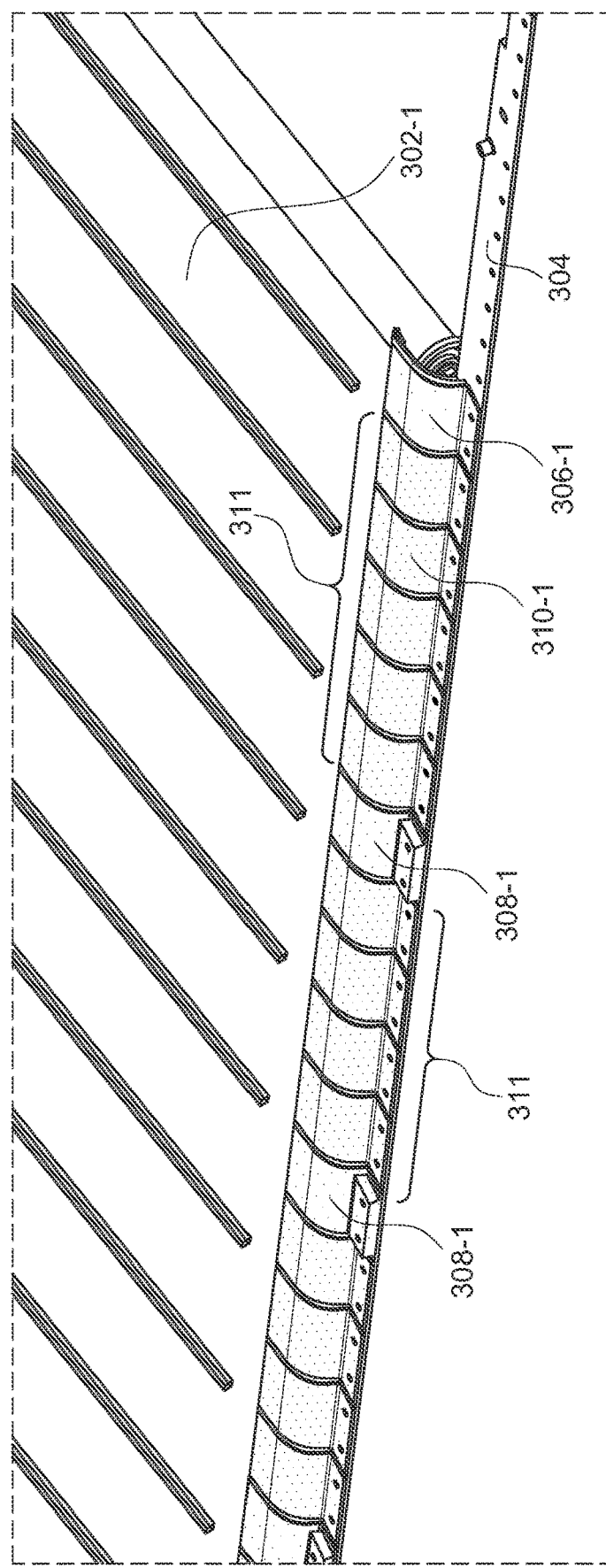
FIG. 4 illustrates crop ramps on a left side of the bottom deck of FIG. 3.

FIG. 4 illustrates crop ramps on the left side of the bottom deck 300 of FIG. 3. The third left side crop ramps 310-1 can be arranged in consecutive positions along the cutterbar 304 to form one or more third crop ramp sets 311 that include a plurality of third left side crop ramps 310-1. Each of the one or more third crop ramp sets 311 is separated by one second left side crop ramp 308-1. A similar arrangement of crop ramps can be provided on the right side of the crop ramp and is not shown herein.

Figure 5:
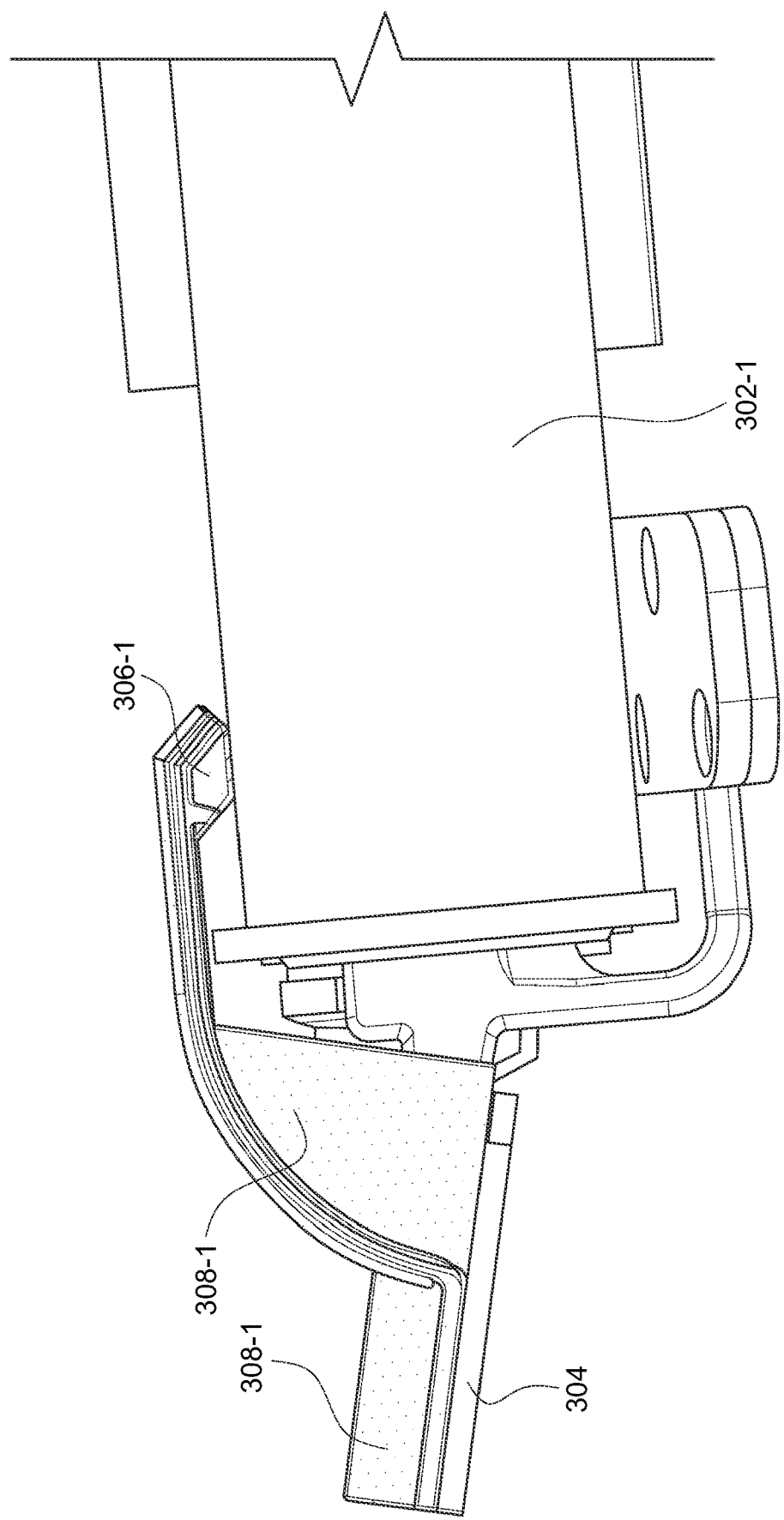
FIG. 5 illustrates a side view of the left side of the bottom deck of FIG. 3 according to some implementations of the present disclosure.

FIG. 5 illustrates a side view of part of the left side of the bottom deck 300 of FIG. 3 according to some implementations of the present disclosure. The first left side crop ramp 306-1 is shown next to other left side crop ramps (e.g., the second left side crop ramp 308-1). The other left side crop ramps include a wall that substantially limits a volume between the left side belt 302-1 and the other left side crop ramps. The wall is positioned such that the wall overhangs or is flush with the cutterbar 304 so that any debris or material that enters the volume between the left side belt 302-1 and the wall falls directly down and does not sit and accumulate on the cutterbar.

The first left side crop ramp 306-1 does not have the wall, and hence, there is a larger volume between the left side belt 302-1 and the first left side crop ramp 306-1. The first left side crop ramp 306-1 is also shown to hover and/or substantially touch the left side belt 302-1 to prevent dirt and other debris from moving from the belt into the volume between the left side belt 302-1 and the first left side crop ramp 306-1. Each of the crop ramps includes this feature of substantially toughing the left side belt 302-1 to prevent material from entering a volume between the left side belt 302-1 and a respective crop ramp.

Figure 6:
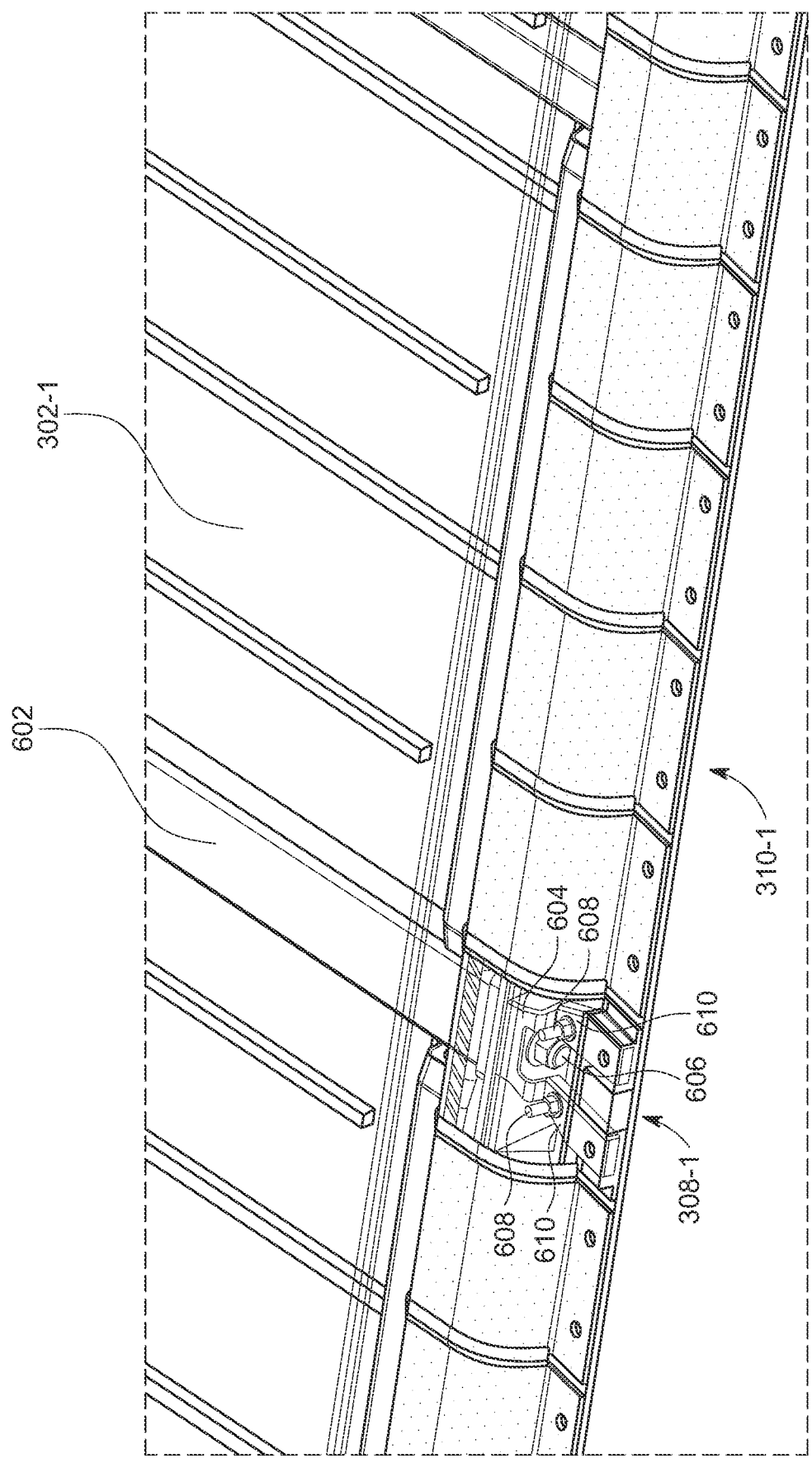
FIG. 6 illustrates a flex arm being connected to a cutterbar underneath one of the crop ramps in FIG. 4, according to some implementations of the present disclosure.

FIG. 6 illustrates a flex arm 602 being connected to the cutterbar 304 underneath one of the second left side crop ramps 308-1 of FIG. 4, according to some implementations of the present disclosure. The second left side crop ramp 308-1 is provided in on the cutterbar 304 at a location across from the flex arm 602. Flex arms (including the flex arm 602) are provided under the left side belt 302-1 such that the flex arms provide a shaping to the left side belt 302-1. The shaping prevents the left side belt 302-1 from collapsing at locations that are distant from the rollers of the left side belt 302-1. The flex arms also allow the bottom deck 300 to be flexible such that the bottom deck 300 can contour a surface or terrain that the header is tracing during harvesting. That is one flex arm can be at a higher level compared to another flex arm depending on the terrain. Each of the crop ramps are provided as individual pieces to accommodate such changes in terrain such that bends in the cutterbar 304 can be translated to the crop ramps. The crop ramps can interlock, allowing each neighboring piece to move in a direction dictated by the flex arms.

The flex arm 602 is attached to the cutterbar 304 using a casting 604. The flex arm 602 fits within the casting 604 and is attached to the casting 604 with a bolt 606. The casting 610 includes extensions 610 that fit under the second left side crop ramp 308-1. The extensions are secured to the cutterbar 304 using bolts 608, and the second left side crop ramp 308-1 includes one or more enclosures for receiving the extensions 610. Although illustrated as using the casting 604 with the extensions 610, in some implementations, the flex arm 602 is fashioned as a monolith to have a shape of the casting 604 and the extensions 610 for direct coupling to the cutterbar 304 and the second left side crop ramp 308-1.

As provided in some embodiments of the present disclosure, some crop ramps include walls and others do not, and some can include spacing for accommodating flex arms. Furthermore, the crop ramps can interlock with each other to simulate a continuous part that allows movement within the interlocking regions such that the cutterbar can contour or trace a surface where crops are being cut. Interlocking crop ramps also prevent cut crops being transported by the lateral belts (e.g., the left side belt 302-1 or the right side belt 302-2) from hairpinning on the crop ramps while the cut crops are being transported to the center of the header. The following description discusses examples of crop ramps for at least providing the aforementioned features.

Figure 7A:
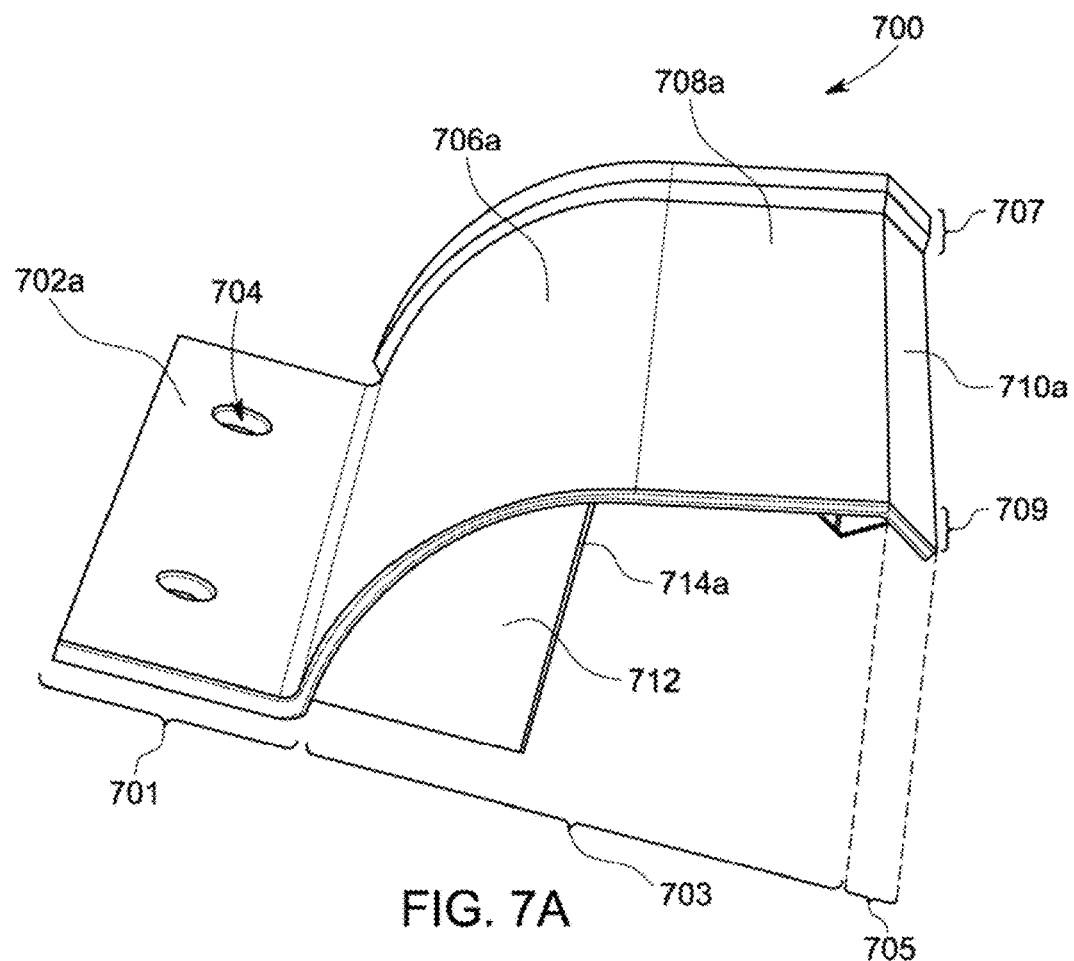
FIGS. 7A-7D illustrate different views of a first crop ramp according to some implementations of the present disclosure.
Figure 7B:
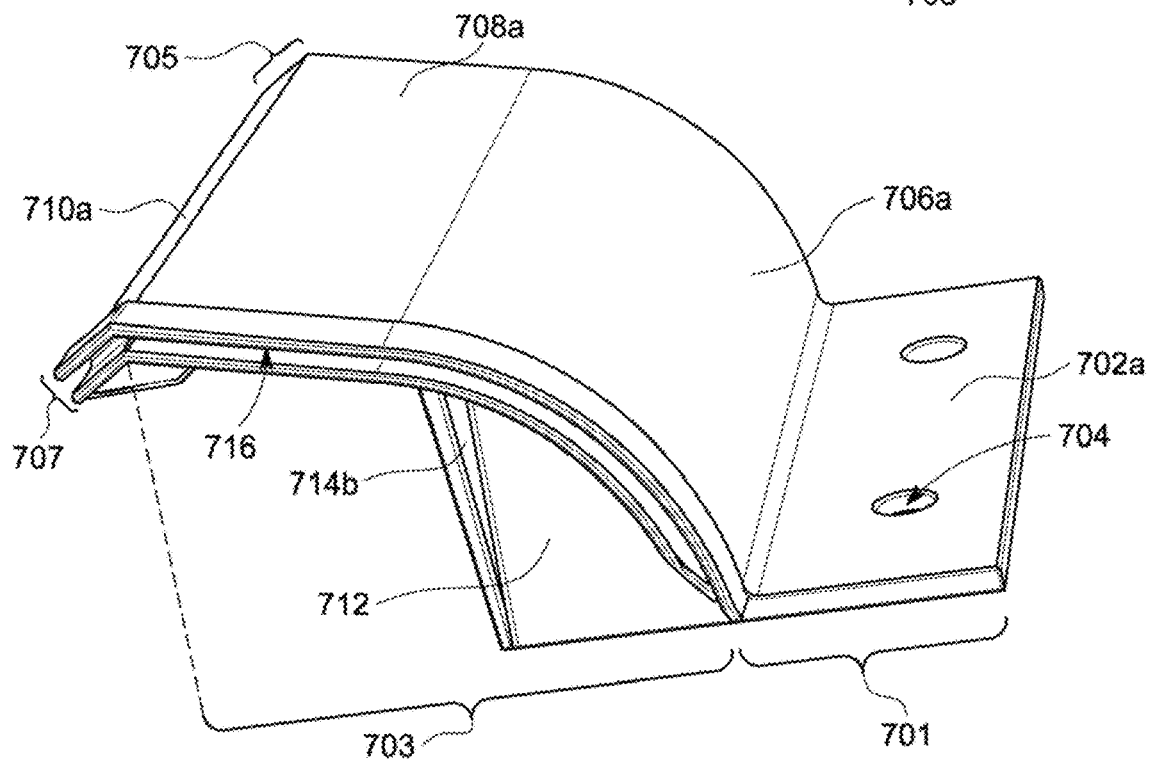
Figure 7C:
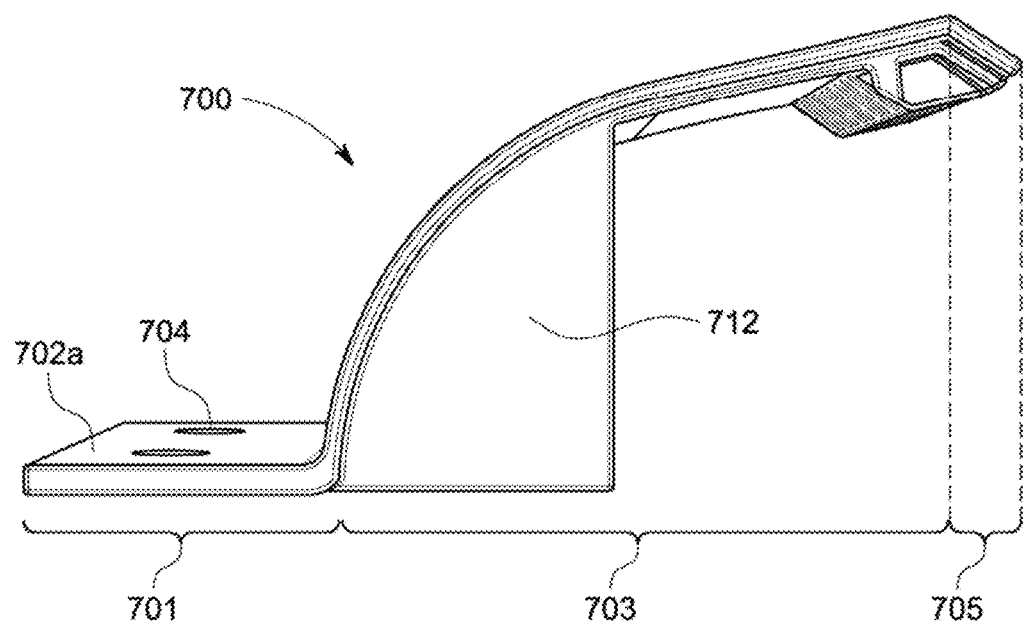
Figure 7D:
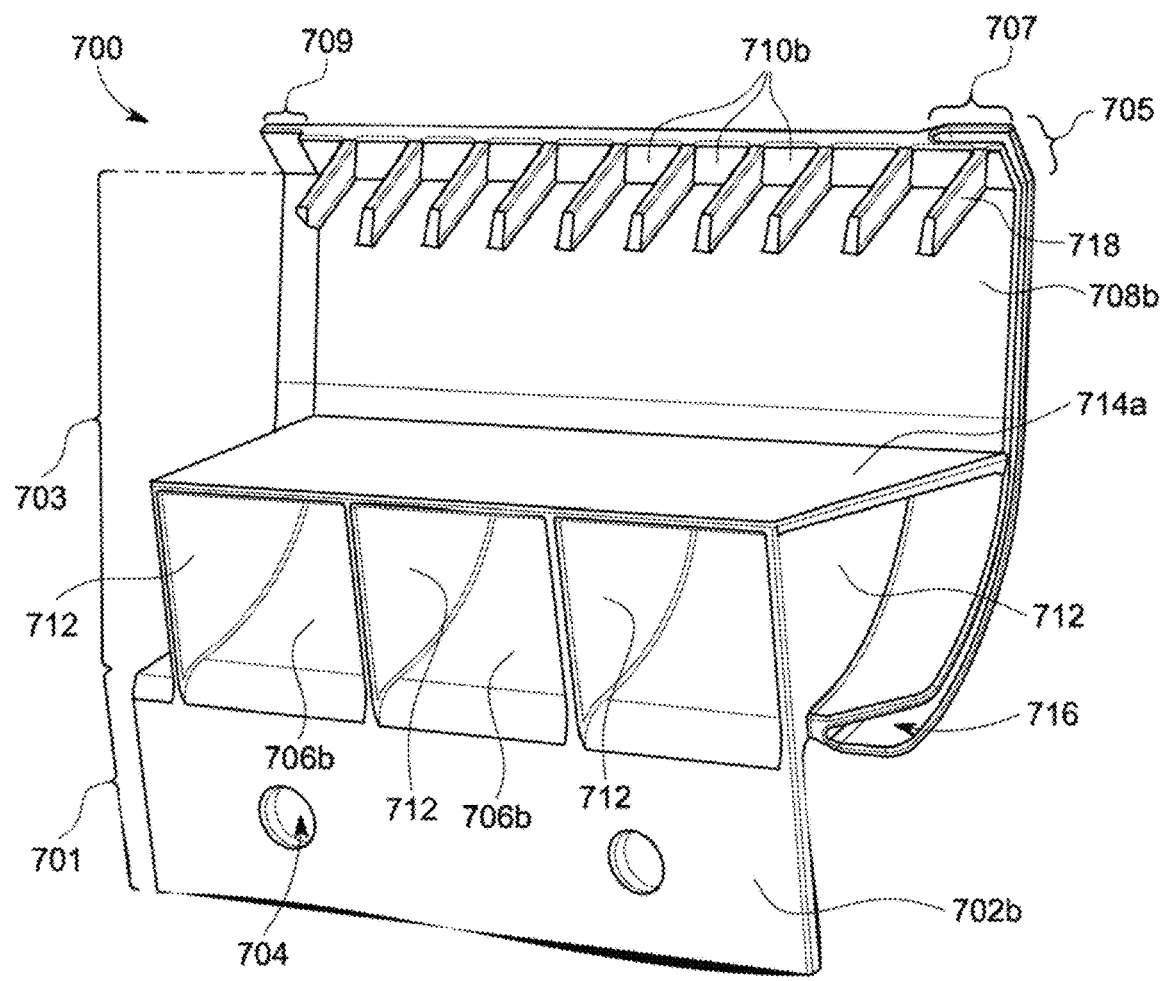

FIGS. 7A-7D illustrate different views of a first type of crop ramp 700 according to some implementations of the present disclosure. FIG. 7A provides a back perspective view the first type of crop ramp 700 from one side. FIG. 7B provides a back perspective view of the first type of crop ramp 700 from an opposite side. FIG. 7C provides a right side view of the first type of crop ramp 700. FIG. 7D provides a bottom perspective view of the first type of crop ramp 700. The first type of crop ramp 700 can be described in sections that include a flat section 701, a curved section 703, and a flange 705.

Referring to FIG. 7A, the flat section 701 includes a top surface 702a (and a bottom surface 702b as illustrated in FIG. 7D). The flat section 701 facilitates coupling the crop ramp 700 to a cutterbar (e.g., the cutterbar 304 of FIG. 3). The flat section 701 includes one or more holes 704 for enabling the coupling of the crop ramp 700 to the cutterbar. When the crop ramp 700 is coupled to the cutterbar, the bottom surface 702b (as illustrated in FIG. 7D) of the crop ramp 700 is in contact with the cutterbar.

The curved section 703 includes a top arched surface 706a and a top flat surface 708a (and a bottom arched surface 706b and a bottom flat surface 708b as illustrated in FIG. 7D). The curved section 703 extends from the flat section 701 and facilitates transfer of cut crops to a belt system. Cut crops are transferred in a direction defined from the flat section 701 to the curved section 703.

The flange 705 is a lip that extends from the curved section 703. The flange 705 includes a top surface 710a and a bottom surface 710b. The flange 705 is configured to hover above a belt (e.g., the right side belt 302-2 of FIG. 3) to prevent dirt or other debris from flowing in a direction defined from the curved section 703 to the flat section 701. The flange 705 is angled such that the top surface 710a hinders cut crops or other material from flowing in the direction, thus promoting the cut crops to stay on the belt.

In some implementations, one side of the crop ramp 700 includes a section 707 for providing a groove 716 (as illustrated in FIG. 7B). The groove 716 can contour the curved section 703 and/or the flange 705 on the one side of the crop ramp 700. In some implementations, another side of the crop ramp 700 includes a section 709 that fits inside a groove of a neighboring crop ramp. For example, the crop ramp 700 is a crop ramp arranged in the middle of two crop ramps such that the crop ramp 700 has a first neighboring crop ramp and a second neighboring crop ramp. The groove 716 facilitates connecting the first neighboring crop ramp such that a section of the first neighboring crop ramp fits into the groove 716 to interlock the crop ramp 700 and the first neighboring crop ramp. The section 709 of the crop ramp 700 then fits into a groove of the second neighboring crop ramp to interlock the crop ramp 700 and the second neighboring crop ramp. Since the groove 716 is provided in the section 707, a top surface of the section 707 is slightly elevated compared to the top flat surface 708a, the top arched surface 706a, and the top surface 710a. As such, in some implementations, surfaces of interlocked neighboring crop ramps have a step where a groove of a first crop ramp transitions to a top flat (or arched) surface of a second crop ramp.

In some implementations, the crop ramp 700 includes a vertical wall with wall surfaces 714a and 714b. The vertical wall is provided at the curved section 703. The vertical wall can be provided at any position on the curved section 703 along the bottom arched surface 706b. In some implementations, the vertical wall is provided at a position on the curved section 703 at the bottom flat surface 708b. The wall surface 714a faces the belt while the wall surface 714b faces away from the belt. The vertical wall reduces an effective volume underneath the crop ramp that is exposed to the belt. That is, a vertical wall positioned closer to the flat section 701 allows more volume underneath the crop ramp to be exposed to the belt than a vertical wall positioned closer to the flange. In some implementations, the vertical wall surface 714a is flush with the cutterbar such that a combined length of the flat section 701 and a position of the vertical wall is about a width of the cutterbar. In some implementations, the combined length is greater than the width of the cutterbar such that the vertical wall overhangs the cutterbar.

The curved section 703 can further include one or more sidewalls 712 for providing structural support to the vertical wall. The crop ramp 700 is shown to have four equally spaced sidewalls 712. In some implementations, the sidewalls 712 are not equally spaced. In some implementations, the number of sidewalls 712 is two. The one or more sidewalls 712 extend from the bottom arched surface 706b to meet the vertical wall at the wall surface 714b. The vertical wall can have a trapezoidal cross sectional area such that the vertical wall does not extend into the section 709 (as illustrated in FIG. 7D) but does extend into the section 707. Angles of the vertical wall on the trapezoidal edges can be chosen such that two crop ramps can be removed together. That is, two crop ramps can wedge in and out during servicing. Having this feature prevents a technician from having to remove an extensive and unnecessary amount of crop ramps during servicing. In some implementations, the vertical wall has a rectangular cross sectional area such that when two neighboring crop ramps are interlocked, vertical walls of the crop ramps abut each other.

Referring to FIG. 7D, the crop ramp 700 can further include a texture provided between the curved section 703 and the flange 705. The texture can facilitate trapping dirt particles underneath the flange 705 to prevent the dirt particles from continuing further in a direction towards to the walls surface 714a. In some implementations, the texture includes a plurality of stiffening ribs or a plurality of panels 718 extruding from the bottom surface 710b of the flange 705. The plurality of panels 718 can be configured to structurally support the flange 705 with the curved section 703. The plurality of panels 718 can communicate stresses on the flange 705 exerted by cut crops or debris on the belt to the curved section 703 to prevent excess strain on the flange 705. Although the texture is shown as the plurality of panels 718, other texture designs are possible, for example a cross-hatched design, straight instead of angled panels, etc.

The crop ramp 700 is an example of the third right side crop ramp 310-2. The third left side crop ramp 310-1 differs from the third right side crop ramp 310-2 in that the section 707 and the section 709 are switched. For example, if the third right side crop ramp 310-2 has the section 707 with the groove 716 on its left side, then the third left side crop ramp 310-1 has a section with a groove on its right side. Each of the plurality of panels 718 is shown in FIG. 7D extending from the bottom surface 710b at an angle away from the groove 716. The third left side crop ramp 310-1 should keep a same orientation with a plurality of panels provided at an angle away from the groove on its right side.

In some implementations, a depth of a crop ramp (e.g., the first type of crop ramp 700 as illustrated in FIG. 7C) is about 135 mm. That is, the combined length of the flat section 701, the curved section 703, and the flange 705 is about 135 mm when measured from the side profile in FIG. 7C. In some implementations, a height of a crop ramp (e.g., the first type of crop ramp 700 as illustrated in FIG. 7C) is about 70 mm. In some implementations, a width of a crop ramp (e.g., a width spanning the section 707 and the section 709, inclusive, as depicted in FIG. 7D) is about 150 mm. In some implementations, a crop ramp fits into a volume defined by 70 mm by 150 mm by 135 mm.

Figure 8A:
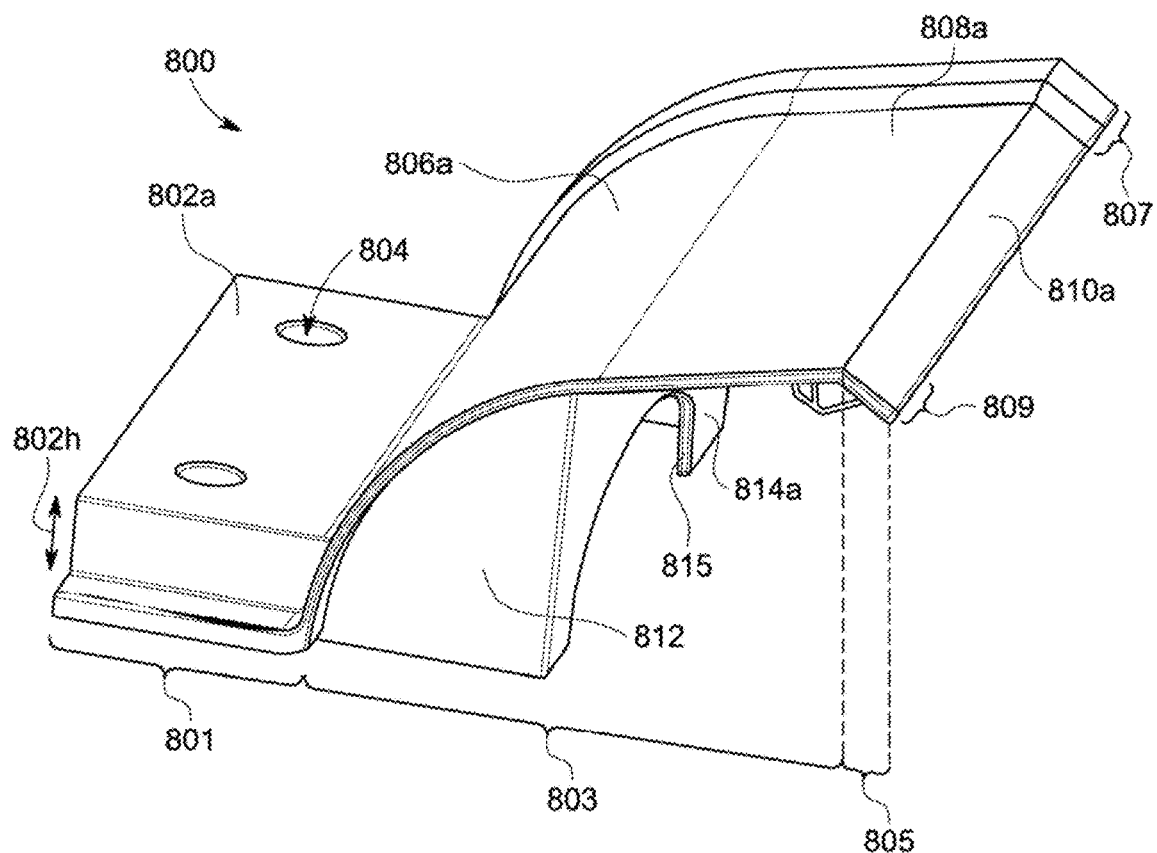
FIGS. 8A-8D illustrate different views of a second crop ramp according to some implementations of the present disclosure.
Figure 8B:
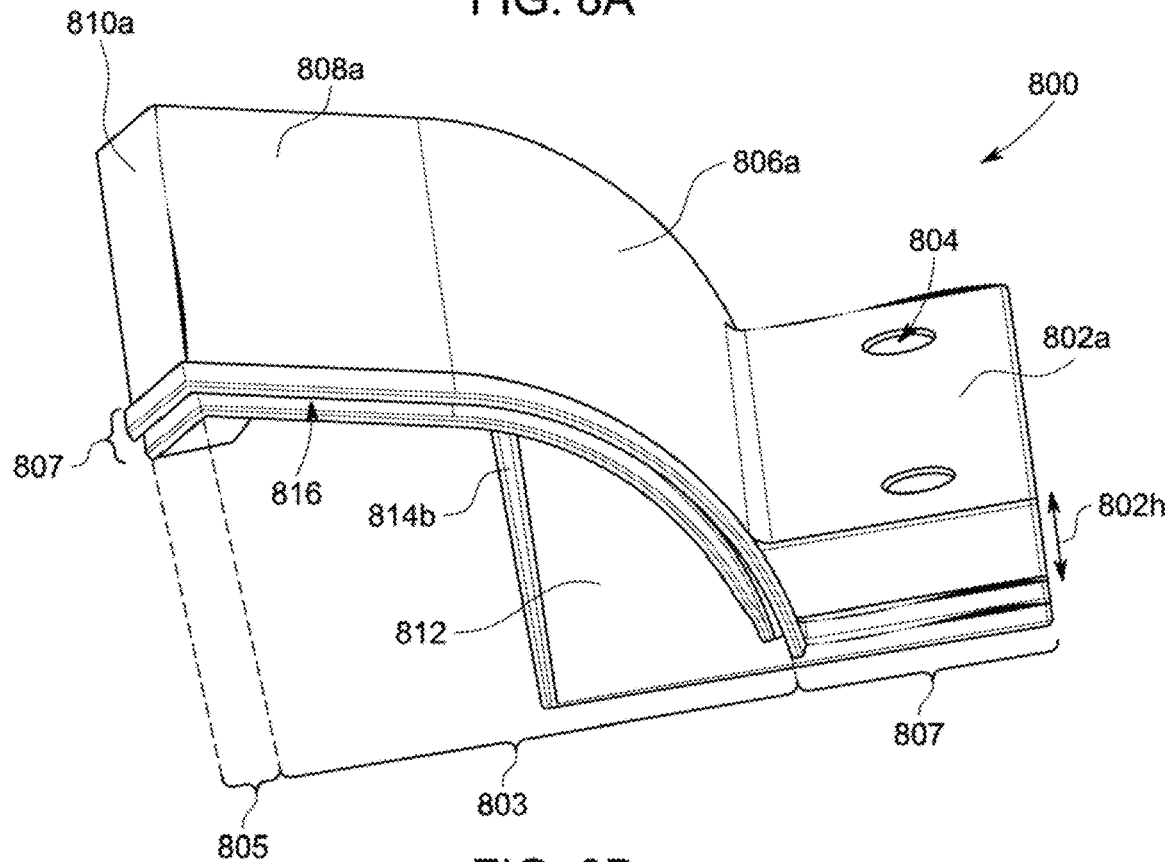
Figure 8C:
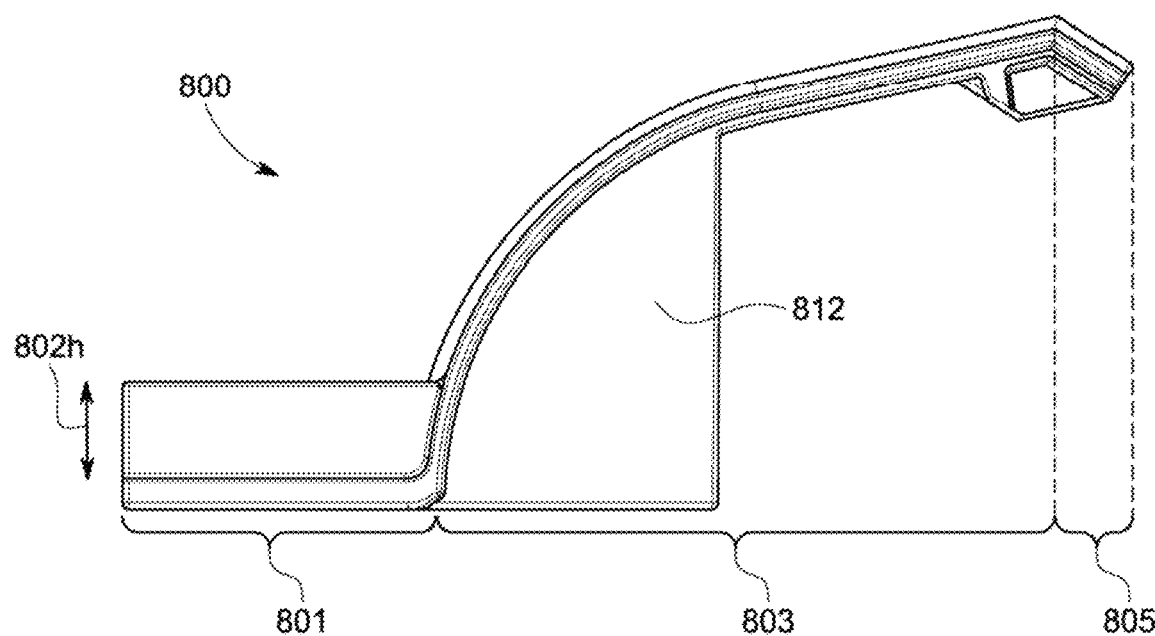
Figure 8D:
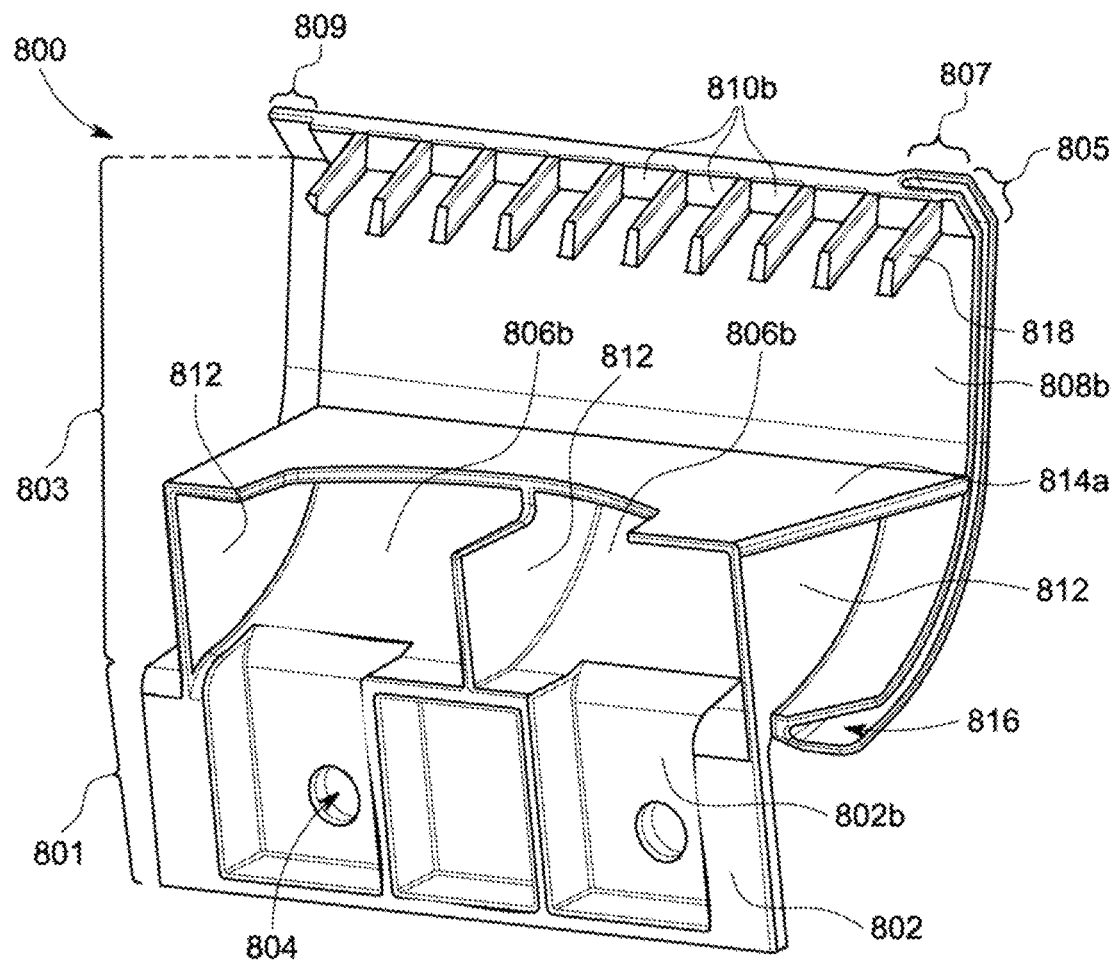

FIGS. 8A-8D illustrate different views of a second type of crop ramp 800 according to some implementations of the present disclosure. FIG. 8A provides a perspective view the second type of crop ramp 800 from one side. FIG. 8B provides a perspective view of the second type of crop ramp 800 from an opposite side. FIG. 8C provides a right side view of the second type of crop ramp 800. FIG. 8D provides a bottom perspective view of the second type of crop ramp 800. Similar to the crop ramp 700, the second type of crop ramp 800 can be described in sections that include a flat section 801, a curved section 803, and a flange 805.

Referring to FIG. 8A, the flat section 801 includes a top surface 802a (and a bottom surface 802b as illustrated in FIG. 8D). The flat section 801 facilitates coupling the crop ramp 800 to a cutterbar (e.g., the cutterbar 304 of FIG. 3) and to a flex arm (e.g., the flex arm 602 of FIG. 6). The flat section 801 includes one or more holes 804 for enabling the coupling of the crop ramp 800 to the cutterbar and the flex arm. The flat section 801 has a height 802h. The height 802h is provided because when the flat section 801 is coupled to the cutterbar, the flat section 801 forms an enclosure with a height dictated by the height 802h. In some implementations, the height 802h is about 20 mm. When the crop ramp 800 is coupled to the cutterbar and the flex arm, the bottom surface 802b (as illustrated in FIG. 8D) of the crop ramp 800 is in contact with the cutterbar and the flex arm (or a casting coupled to the flex arm, as shown in FIG. 6).

Similar to FIGS. 7A-7D, the curved section 803 of FIGS. 8A-8D includes a top arched surface 806a and a top flat surface 808a (and a bottom arched surface 806b and a bottom flat surface 808b as illustrated in FIG. 8D). The curved section 803 extends from the flat section 801 and facilitates transfer of cut crops to a belt system. The flange 805 is a lip that extends from the curved section 803. The flange 805 includes a top surface 810a and a bottom surface 810b. The flange 805 is angled such that the top surface 810a hinders cut crops or other material from moving from the belt back onto the crop ramp 800.

The crop ramp 800 can include a section 807 for providing a groove 816 (as illustrated in FIG. 8B). The crop ramp 800 can include a section 809 that fits inside a groove of a neighboring crop ramp. The section 807 and the section 809 are substantially similar to the section 707 and the section 709, respectively, as discussed in connection with FIGS. 7A-7D.

In some implementations, the crop ramp 800 includes a vertical wall with wall surfaces 814a and 814b. The wall surface 814a faces the belt while the wall surface 814b faces away from the belt. The vertical wall is provided at the curved section 803. Similar to FIGS. 7A-7D, the vertical wall of FIGS. 8A-8D can be provided at any position on the curved section 803 along the bottom arched surface 806b or the bottom flat surface 808b. The vertical wall can be patterned as shown FIGS. 8A and 8D to facilitate coupling of the crop ramp 800 to a flex arm. For example, compared to the vertical wall shown in FIGS. 7A and 7D, the vertical wall in FIGS. 8A and 8D is cut out to provide the flex arm, or extensions of a casting (as illustrated in FIG. 6), access to the flat section 801 of the crop ramp 800.

The curved section 803 can further include one or more sidewalls 812 for providing structural support to the vertical wall. The one or more sidewalls 812 extending from the bottom arched surface 806b to meet the vertical wall at the wall surface 814b. The crop ramp 800 can further include a texture provided between the curved section 803 and the flange 805. In some implementations, the texture includes a plurality of panels 818 which are the similar to the plurality of panels 718 previously described in connection to FIG. 7D.

The crop ramp 800 is an example of the second right side crop ramp 308-2. The second left side crop ramp 308-1 differs from the second right side crop ramp 308-2 in that the section 807 and the section 809 are switched. For example, if the second right side crop ramp 308-2 has the section 807 with the groove 816 on its left side, then the second left side crop ramp 308-1 has a section with a groove on its right side.

Figure 9A:
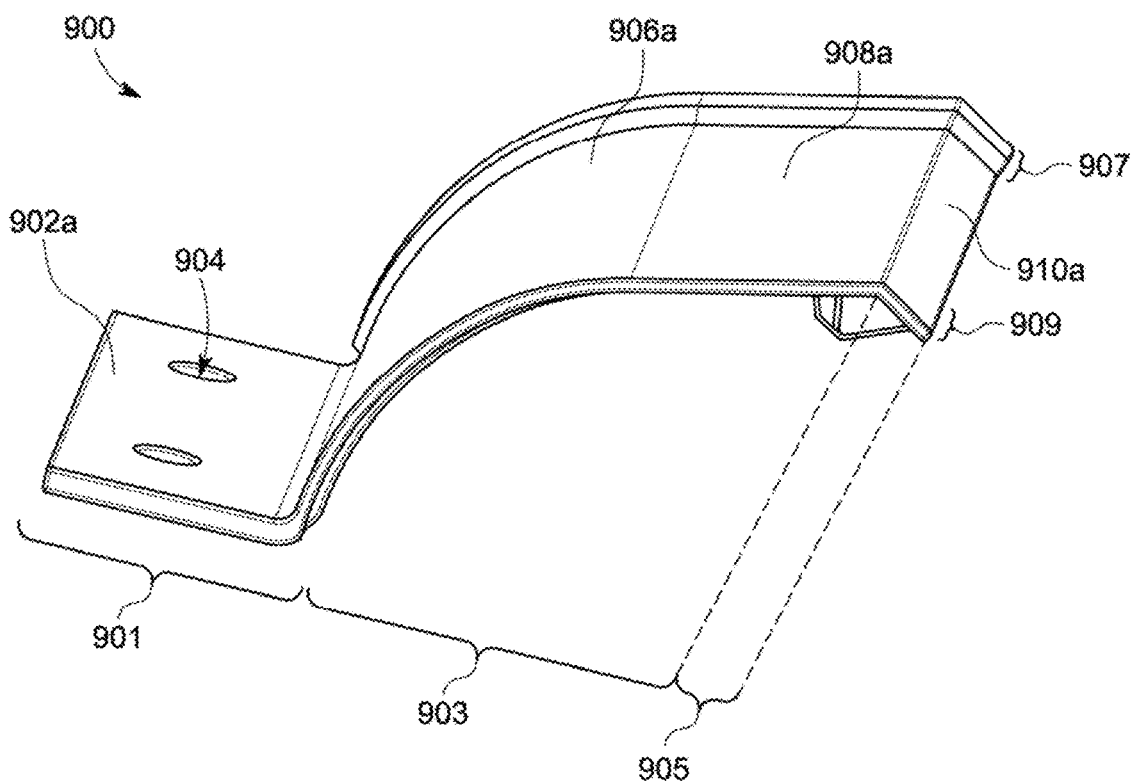
FIGS. 9A-9D illustrate different views of a third crop ramp according to some implementations of the present disclosure.
Figure 9B:
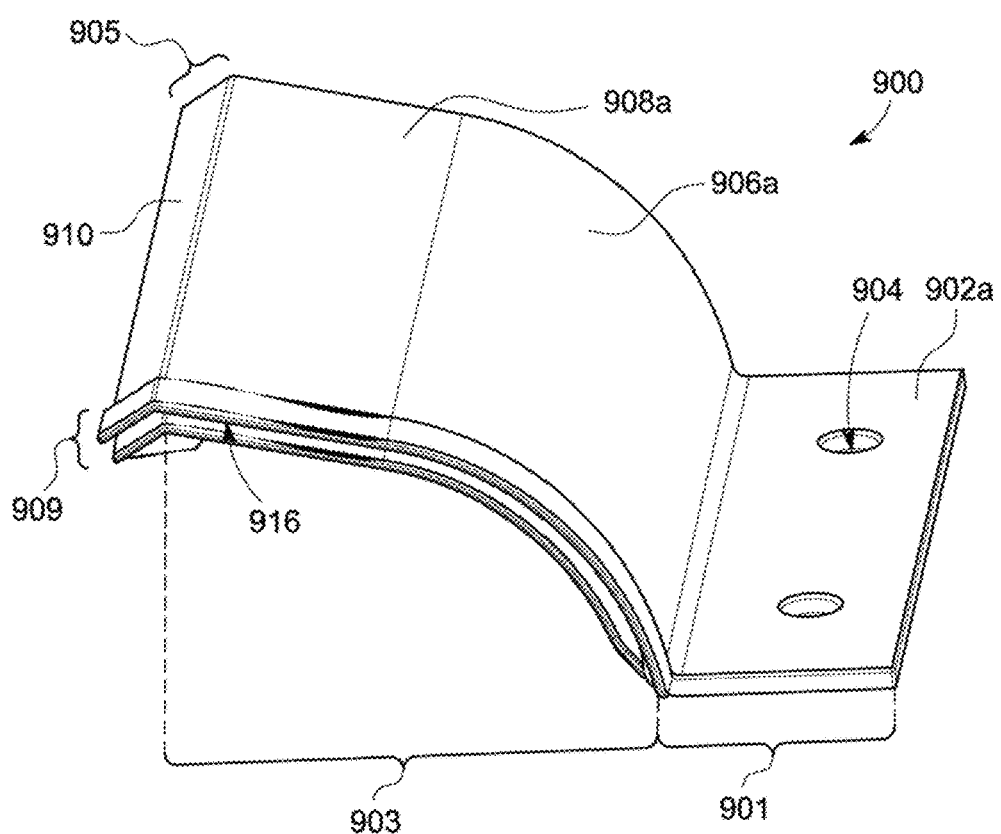
Figure 9C:
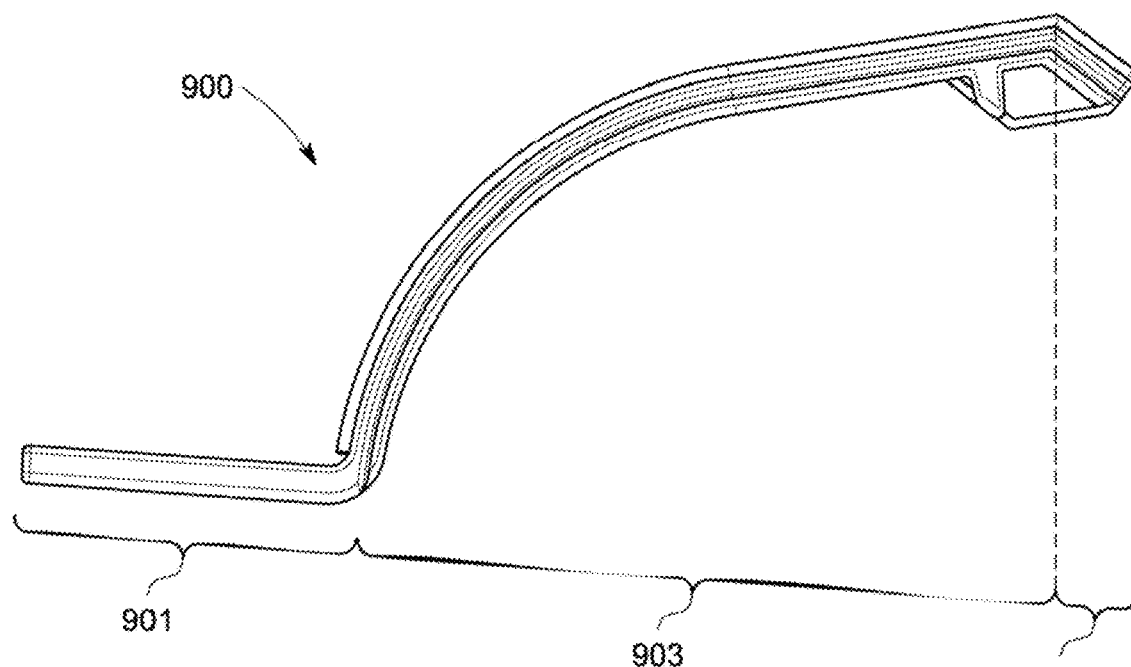
Figure 9D:
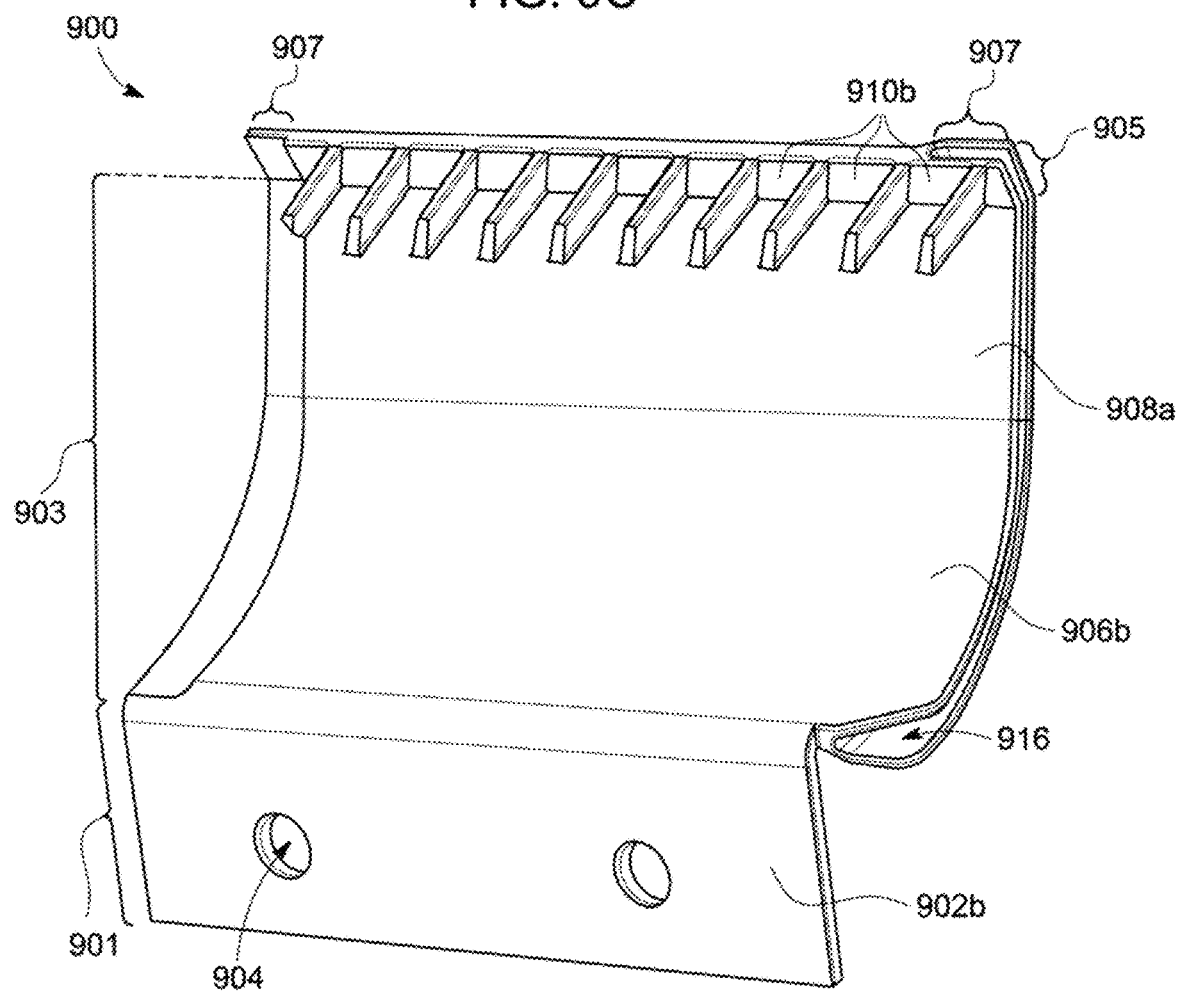

FIGS. 9A-9D illustrate different views of a third type of crop ramp 900 according to some implementations of the present disclosure. FIG. 9A provides a perspective view the third type of crop ramp 900 from one side. FIG. 9B provides a perspective view of the third type of crop ramp 900 from an opposite side. FIG. 9C provides a right side view of the third type of crop ramp 900. FIG. 9D provides a bottom perspective view of the third type of crop ramp 900. Similar to the crop ramp 700, the third type of crop ramp 900 can be described in sections that include a flat section 901, a curved section 903, and a flange 905.

Referring to FIG. 9A, the flat section 901 includes a top surface 902a (and a bottom surface 902b as illustrated in FIG. 9D). The flat section 901 also includes one or more holes 904 for allowing the coupling of the crop ramp 900 to a cutterbar. The flat section 901 is substantially similar to or the same as the flat section 701 previously described in connection with FIGS. 7A-7D. The flange 905 is a lip that extends from the curved section 903. The flange 905 includes a top surface 910a and a bottom surface 910b. The flange 905 is substantially similar to or the same as the flange 705 as previously described in connection with FIGS. 7A-7D.

The curved section 903 includes a top arched surface 906a and a top flat surface 908a (and a bottom arched surface 906b and a bottom flat surface 908b as illustrated in FIG. 9D). The curved section 903 extends from the flat section 901 and facilitates transfer of cut crops to a belt system. The crop ramp 900 can further include a texture provided as a plurality of panels. In some implementations, the crop ramp 900 includes a section 907 for providing a groove 916 (as illustrated in FIG. 9B) and a section 909 that fits inside a groove of a neighboring crop ramp. The section 907 and the section 909 are substantially similar to or the same as the section 707 and the section 709, respectively, as previously described in connection with FIGS. 7A-7D.

The crop ramp 900 does not include a vertical wall like the crop ramp 700 or the crop ramp 800. The crop ramp 900 is an example of the first right side crop ramp 306-2. The first left side crop ramp 306-1 differs from the first right side crop ramp 306-2 in that the section 907 and the section 909 are switched. For example, if the first right side crop ramp 306-2 has the section 907 with the groove 916 on its left side, then the first left side crop ramp 306-1 has a section with a groove on its right side.

Figure 10:
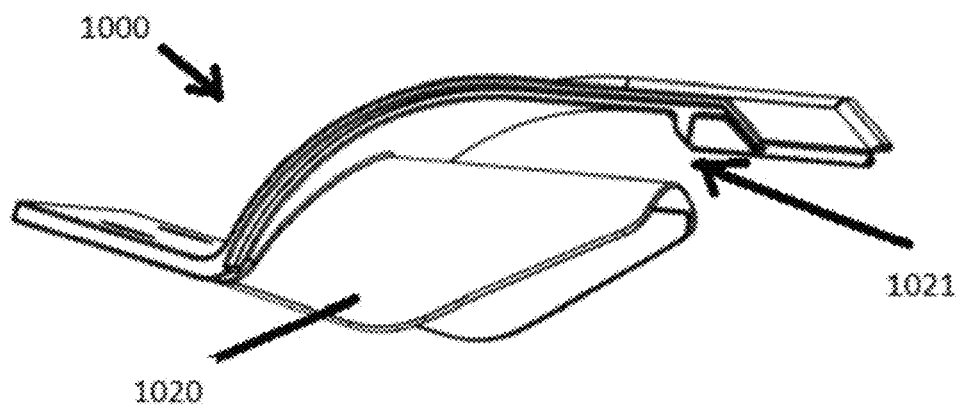
FIG. 10 illustrates a crop ramp with belt support according to some implementations of the present disclosure.

In some implementations, crop ramps can provide support for an adjacent belt. For example, FIG. 10 illustrates a crop ramp 1000 with a belt support 1020 extending from a curved section of the crop ramp 1000. The crop ramp 1000 is provided without a vertical wall, but in some implementations, a vertical wall can be included. The belt support 1020 would merely extend from the vertical wall instead of the bottom arched surface of the crop ramp 1000. When the crop ramp 1000 is installed on a cutterbar of a combine header, the adjacent belt on the combine header sits in the volume indicated by arrow 1021 such that the belt rests atop the belt support 1020 and a flange of the crop ramp 1000 hovers over the belt (as provided in FIG. 5 where the flange of the first left side crop ramp 306-1 substantially touches the belt 302-1).

ALTERNATIVE IMPLEMENTATIONS

Alternative Implementation 1. A crop ramp for use in a combine header is provided. The crop ramp includes a flat section, a curved section, and a flange. The flat section facilitates coupling the crop ramp to a cutterbar of the combine header. The curved section extends from the flat section and is configured to facilitate transfer of crop to a belt system of the combine header. The crop is transferred in a first direction defined from the flat section to the curved section. The flange extends from the curved section and is configured to hover above the belt system of the combine header to prevent dirt from flowing in a second direction which is opposite to the first direction.

Alternative Implementation 2. The crop ramp of alternative implementation 1, wherein the belt system moves crops in a third direction which is orthogonal to the first direction and the second direction.

Alternative Implementation 3. The crop ramp of any of the alternative implementations 1 or 2 further including a groove provided on one side of the crop ramp. The groove contours the curved section and is configured to receive a curved section of a neighboring crop ramp, such that receiving the curved section of the neighboring crop ramp prevents hairpinning of the crop between the crop ramp and the neighboring crop ramp Alternative Implementation 4. The crop ramp of the alternative implementation 3, wherein the groove further contours the flange and is further configured to receive a flange of the neighboring crop ramp.

Alternative Implementation 5. The crop ramp of any of the alternative implementations 1-4 further including a texture provided between the curved section and the flange. The texture is configured to trap dirt particles underneath the flange.

Alternative Implementation 6. The crop ramp of any of the alternative implementations 1-5, wherein the flat section is configured to be coupled to a flex arm of the combine header.

Alternative Implementation 7. The crop ramp of alternative implementation 6, wherein the flat section forms an enclosure for receiving part of the flex arm of the combine header.

Alternative Implementation 8. The crop ramp of any of the alternative implementations 1-7, wherein the curved section includes a vertical wall that reduces an effective volume underneath the crop ramp that is exposed to the belt system of the combine header.

Alternative Implementation 9. The crop ramp of alternative implementation 8, wherein the vertical wall is patterned to allow casting of part of a flex arm of the combine header to be received by the crop ramp.

Alternative Implementation 10. The crop ramp of alternative implementation 8, wherein the vertical wall has a trapezoidal cross sectional area.

Alternative Implementation 11. A combine header including a cutterbar, a belt system, and a plurality of crop ramps. The cutterbar is configured to cut crops. The belt system is configured to facilitate movement of the cut crops toward a feeder house. A respective crop ramp of the plurality of crop ramps includes a flat section, a curved section, and a flange. The flat section facilitates coupling the respective crop ramp to the cutterbar. The curved section extends from the flat section and facilitates transfer of the cut crops to the belt system. The cut crops travel along a surface of the curved section in a first direction, the first direction oriented from the flat section towards the curved section Alternative Implementation 12. The combine header of alternative implementation 11, wherein the belt system includes a first belt and a second belt, the first belt and the second belt being configured to move the cut crops laterally toward a center of the combine header, and wherein the lateral movement of the cut crops are in a third direction which is orthogonal to the first direction and the second direction.

Alternative Implementation 13. The combine header of any of alternative implementations 11 or 12, wherein the respective crop ramp further includes a groove provided on one side of the respective crop ramp, the groove contouring the curved section of the respective crop ramp and configured to receive the curved section of a neighboring crop ramp of the plurality of crop ramps. Receiving the curved section of the neighboring crop ramp prevents hairpinning of the cut crops between the respective crop ramp and the neighboring crop ramp.

Alternative Implementation 14. The combine header of alternative implementation 13, wherein the groove of the respective crop ramp further contours the flange of the respective crop ramp and is further configured to receive the flange of the neighboring crop ramp.

Alternative Implementation 15. The combine header of any of the alternative implementations 13 or 14, wherein the plurality of crop ramps includes a left set of crop ramps and a right set of crop ramps, the left set of crop ramps including crop ramps with grooves on a left side of the crop ramps and the right set of crop ramps including crop ramps with grooves on a right side of the crop ramps.

Alternative Implementation 16. The combine header of any of the alternative implementations 11-15, wherein the respective crop ramp of the plurality of crop ramps includes a texture provided between the curved section and the flange, the texture being configured to trap dirt particles underneath the flange.

Alternative Implementation 17. The combine header of alternative implementation 16, wherein the texture includes a plurality of panels extruding from the flange, the plurality of panels being configured to structurally support the flange and the curved section.

Alternative Implementation 18. The combine header of any of the alternative implementations 11-17, wherein the plurality of crop ramps includes a first set of crop ramps aligned with a corresponding set of flex arms of the combine header, wherein the flat section of a respective crop ramp in the first set of crop ramps includes an enclosure for receiving a part of a respective flex arm in the set of flex arms.

Alternative Implementation 19. The combine header of alternative implementation 18, wherein the flat section of the respective crop ramp is coupled to the respective flex arm of the combine header.

Alternative Implementation 20. The combine header of any of the alternative implementations 11-19, wherein the curved section includes a vertical wall that reduces an effective volume underneath the respective crop ramp that is exposed to the belt system.

Alternative Implementation 21. The combine header of alternative implementation 20, wherein the vertical wall has a trapezoidal cross sectional area.

Alternative Implementation 22. The combine header of any of the alternative implementations 11-21, wherein angles associated with the vertical wall facilitates pairwise removal of consecutively positioned crop ramps in the plurality of crop ramps.

While the present disclosure has been described with reference to one or more particular implementations, those skilled in the art will recognize that many changes may be made thereto without departing from the spirit and scope of the present disclosure. Each of these embodiments and implementations and obvious variations thereof is contemplated as falling within the spirit and scope of the present disclosure, which is set forth in the claims that follow.

What is claimed is:

1. A crop ramp for use in a combine header, the crop ramp comprising:
 a flat section for coupling the crop ramp to a cutterbar of the combine header, the flat section configured to be coupled to a flex arm of the combine header and forming an enclosure for receiving part of the flex arm of the combine header;
 a curved section extending from the flat section, the curved section configured to facilitate transfer of crop to a belt system of the combine header, wherein the crop is transferred in a first direction defined from the flat section to the curved section; and
 a flange extending from the curved section, the flange configured to hover above the belt system of the combine header to prevent dirt from flowing in a second direction which is opposite to the first direction.

2. The crop ramp of claim 1, wherein the belt system moves crops in a third direction which is orthogonal to the first direction and the second direction.

3. The crop ramp of claim 1, further comprising:
 a groove provided on one side of the crop ramp, the groove contouring the curved section and configured to receive a curved section of a neighboring crop ramp, such that receiving the curved section of the neighboring crop ramp prevents hairpinning of the crop between the crop ramp and the neighboring crop ramp.

4. The crop ramp of claim 3, wherein the groove further contours the flange and is further configured to receive a flange of the neighboring crop ramp.

5. The crop ramp of claim 1, further comprising:
 a texture provided between the curved section and the flange, the texture configured to trap dirt particles underneath the flange.

6. The crop ramp of claim 1, wherein the curved section includes a vertical wall that reduces an effective volume underneath the crop ramp that is exposed to the belt system of the combine header.

7. The crop ramp of claim 6, wherein the vertical wall is patterned to allow casting of part of a flex arm of the combine header to be received by the crop ramp.

8. The crop ramp of claim 6, wherein the vertical wall has a trapezoidal cross sectional area.

9. A combine header comprising:
 a cutterbar configured to cut crops;
 a belt system configured to facilitate movement of the cut crops toward a feeder house; and a plurality of crop ramps, wherein a respective crop ramp of the plurality of crop ramps includes:
- a flat section for coupling the respective crop ramp to the cutterbar;
- a curved section extending from the flat section, the curved section facilitating transfer of the cut crops to the belt system, wherein the cut crops travel along a surface of the curved section in a first direction, the first direction oriented from the flat section towards the curved section; and
- a flange extending from the curved section, the flange configured to hover above the belt system to prevent dirt from flowing in a second direction which is oriented opposite to the first direction;

wherein the plurality of crop ramps includes a first set of crop ramps aligned with a corresponding set of flex arms of the combine header, wherein the flat section of a respective crop ramp in the first set of crop ramps includes an enclosure for receiving a part of a respective flex arm in the set of flex arms.

10. The combine header of claim 9, wherein the belt system includes a first belt and a second belt, the first belt and the second belt being configured to move the cut crops laterally toward a center of the combine header, and wherein the lateral movement of the cut crops are in a third direction which is orthogonal to the first direction and the second direction.

11. The combine header of claim 9, wherein the respective crop ramp further includes:
- a groove provided on one side of the respective crop ramp, the groove contouring the curved section of the respective crop ramp and configured to receive the curved section of a neighboring crop ramp of the plurality of crop ramps, such that receiving the curved section of the neighboring crop ramp prevents hairpinning of the cut crops between the respective crop ramp and the neighboring crop ramp.

12. The combine header of claim 11, wherein the groove of the respective crop ramp further contours the flange of the respective crop ramp and is further configured to receive the flange of the neighboring crop ramp.

13. The combine header of claim 11, wherein the plurality of crop ramps includes a left set of crop ramps and a right set of crop ramps, the left set of crop ramps including crop ramps with grooves on a left side of the crop ramps and the right set of crop ramps including crop ramps with grooves on a right side of the crop ramps.

14. The combine header of claim 9, wherein the respective crop ramp of the plurality of crop ramps includes:
- a texture provided between the curved section and the flange, the texture being configured to trap dirt particles underneath the flange.

15. The combine header of claim 14, wherein the texture includes a plurality of panels extruding from the flange, the plurality of panels being configured to structurally support the flange and the curved section.

16. The combine header of claim 9, wherein the flat section of the respective crop ramp is coupled to the respective flex arm of the combine header.

17. The combine header of claim 9, wherein the curved section includes a vertical wall that reduces an effective volume underneath the respective crop ramp that is exposed to the belt system.

* * * * *